(12) United States Patent
Mahalingam

(10) Patent No.: US 6,269,417 B1
(45) Date of Patent: *Jul. 31, 2001

(54) METHOD FOR DETERMINING AND DISPLAYING THE PHYSICAL SLOT NUMBER OF AN EXPANSION BUS DEVICE

(75) Inventor: Mallikarjunan Mahalingam, Santa Clara, CA (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,462

(22) Filed: Oct. 1, 1997

Related U.S. Application Data (60) Provisional application No. 60/046,491, filed on May 13, 1997, and provisional application No. 60/046,311, filed on May 13, 1997.

(51) Int. Cl.[7] .................................................. G06F 13/00
(52) U.S. Cl. ................................ 710/104; 710/10; 714/44
(58) Field of Search ................................. 710/100, 101, 710/102, 103, 104, 8, 10; 714/25, 27, 31, 37, 38, 39, 40, 44, 48, 57, 825

(56) References Cited

U.S. PATENT DOCUMENTS

| | | | |
|---|---|---|---|
| 4,057,847 | 11/1977 | Lowell et al. | 364/200 |
| 4,100,597 | 7/1978 | Fleming et al. | 364/474 |
| 4,449,182 | 5/1984 | Rubinson et al. . | |
| 4,672,535 | 6/1987 | Katzman et al. | 364/200 |
| 4,692,918 | 9/1987 | Elliott et al. | 370/85 |
| 4,695,946 | 9/1987 | Andreasen et al. . | |
| 4,707,803 | 11/1987 | Anthony, Jr. et al. . | |
| 4,769,764 | 9/1988 | Levanon | 364/708 |
| 4,774,502 | 9/1988 | Kimura | 340/501 |
| 4,821,180 | 4/1989 | Gerety et al. . | |
| 4,835,737 | 5/1989 | Herrig et al. . | |
| 4,894,792 | 1/1990 | Mitchell et al. | 364/708 |
| 4,949,245 | 8/1990 | Martin et al. . | |
| 4,999,787 | 3/1991 | McNally et al. . | |
| 5,006,961 | 4/1991 | Monico . | |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,136,708 | 8/1992 | Lapourtre et al. | 395/650 |

(List continued on next page.)

FOREIGN PATENT DOCUMENTS

| | | | |
|---|---|---|---|
| 0 866 403 A1 | 9/1998 | (EP) . | |
| 04 333 118 | 11/1992 | (JP) | G06F/1/18 |
| 05 233 110 | 9/1993 | (JP) | G06F/3/00 |
| 07 093 064 | 4/1995 | (JP) | G06F/1/26 |
| 07 261 874 | 10/1995 | (JP) | G06F/1/18 |

OTHER PUBLICATIONS

Technology Brief, Where Do I Plug the Cable? Solving the Logical–Physical Slot Numbering Problem; Compaq Computer Corporation, Dec. 1996.*

(List continued on next page.)

*Primary Examiner*—Glenn A. Auve
(74) *Attorney, Agent, or Firm*—Knobbe Martens Olson & Bear (57) ABSTRACT

A method for displaying the slot number and Hardware Instance Number (HIN) of devices attached to a Peripheral Component Interface (PCI) bus is disclosed. The method determines the slot numbers and HINs for every device attached to the PCI bus. This information is displayed to the user. The method thus provides the user with a mechanism for determining the physical slot location of PCI devices in a computer system once the HIN for the PCI device is known.

9 Claims, 2 Drawing Sheets

U.S. PATENT DOCUMENTS

| | | |
|---|---|---|
| 5,136,715 | 8/1992 | Hirose et al. . |
| 5,138,619 | 8/1992 | Fasang et al. ................ 371/21.1 |
| 5,157,663 | 10/1992 | Major et al. ................ 371/9.1 |
| 5,210,855 | 5/1993 | Bartol . |
| 5,222,897 | 6/1993 | Collins et al. ................ 439/157 |
| 5,245,615 | 9/1993 | Treu ................ 371/16.5 |
| 5,247,683 | 9/1993 | Holmes et al. . |
| 5,253,348 | 10/1993 | Scalise ................ 395/325 |
| 5,265,098 | 11/1993 | Mattson et al. ................ 371/11.1 |
| 5,266,838 | 11/1993 | Gerner ................ 307/19 |
| 5,269,011 | 12/1993 | Yanai et al. . |
| 5,272,382 | 12/1993 | Heald et al. ................ 307/66 |
| 5,272,584 | 12/1993 | Austruy et al. . |
| 5,276,814 | 1/1994 | Bourke et al. . |
| 5,276,863 | 1/1994 | Heider ................ 395/575 |
| 5,277,615 | 1/1994 | Hastings et al. ................ 439/377 |
| 5,280,621 | 1/1994 | Barnes et al. ................ 395/800 |
| 5,283,905 | 2/1994 | Saadeh et al. . |
| 5,307,354 | 4/1994 | Cramer et al. . |
| 5,311,397 | 5/1994 | Harshberger et al. ................ 361/683 |
| 5,311,451 | 5/1994 | Barrett ................ 364/550 |
| 5,317,693 | 5/1994 | Cuenod et al. . |
| 5,329,625 | 7/1994 | Kannan et al. . |
| 5,337,413 | 8/1994 | Lui et al. . |
| 5,351,276 | 9/1994 | Doll, Jr. et al. . |
| 5,367,670 | 11/1994 | Ward et al. . |
| 5,379,184 | 1/1995 | Barraza et al. ................ 361/685 |
| 5,386,567 | 1/1995 | Lien et al. . |
| 5,388,267 | 2/1995 | Chan et al. ................ 395/700 |
| 5,402,431 | 3/1995 | Saadeh et al. ................ 371/67.1 |
| 5,404,494 | 4/1995 | Garney . |
| 5,423,025 | 6/1995 | Goldman et al. . |
| 5,430,717 | 7/1995 | Fowler et al. ................ 370/58.2 |
| 5,430,845 | 7/1995 | Rimmer et al. . |
| 5,432,715 | 7/1995 | Shigematsu et al. ................ 364/551.01 |
| 5,432,946 | 7/1995 | Allard et al. ................ 395/750 |
| 5,438,678 | 8/1995 | Smith ................ 395/750 |
| 5,440,748 | 8/1995 | Sekine et al. . |
| 5,448,723 | 9/1995 | Rowett . |
| 5,455,933 | 10/1995 | Schieve et al. . |
| 5,460,441 | 10/1995 | Hastings et al. ................ 312/298 |
| 5,463,766 | 10/1995 | Schieve et al. ................ 395/650 |
| 5,465,349 | 11/1995 | Geronimi et al. . |
| 5,471,634 | 11/1995 | Giorgio et al. . |
| 5,473,499 | 12/1995 | Weir ................ 361/58 |
| 5,483,419 | 1/1996 | Kaczeus, Sr. et al. . |
| 5,485,550 | 1/1996 | Dalton ................ 395/51 |
| 5,487,148 | 1/1996 | Komori et al. . |
| 5,491,791 | 2/1996 | Glowny et al. . |
| 5,493,574 | 2/1996 | McKinley . |
| 5,493,666 | 2/1996 | Fitch . |
| 5,513,314 | 4/1996 | Kandasamy et al. ................ 395/182.04 |
| 5,513,339 | 4/1996 | Agrawal et al. . |
| 5,515,515 | 5/1996 | Kennedy et al. . |
| 5,517,646 | 5/1996 | Piccirillo et al. . |
| 5,519,851 | 5/1996 | Bender et al. . |
| 5,526,289 | 6/1996 | Dinh et al. ................ 364/557 |
| 5,528,409 | 6/1996 | Cucci et al. ................ 359/171 |
| 5,530,810 | 6/1996 | Bowman . |
| 5,533,193 | 7/1996 | Roscoe . |
| 5,535,326 | 7/1996 | Baskey et al. ................ 395/182.02 |
| 5,542,055 | 7/1996 | Amini et al. . |
| 5,546,272 | 8/1996 | Moss et al. ................ 361/687 |
| 5,548,712 | 8/1996 | Larson et al. ................ 395/182.05 |
| 5,555,510 | 9/1996 | Verseput et al. . |
| 5,559,764 | 9/1996 | Chen et al. ................ 396/30 |
| 5,559,958 | 9/1996 | Farrand et al. ................ 395/183.03 |
| 5,559,965 | 9/1996 | Oztaskin et al. . |
| 5,560,022 | 9/1996 | Dunstan et al. . |
| 5,564,024 | 10/1996 | Pemberton . |
| 5,566,299 | 10/1996 | Billings et al. . |
| 5,566,339 | 10/1996 | Perholtz et al. ................ 395/750 |
| 5,568,610 | 10/1996 | Brown . |
| 5,568,619 | 10/1996 | Blackledge et al. . |
| 5,572,403 | 11/1996 | Mills ................ 361/695 |
| 5,577,205 | 11/1996 | Hwang et al. . |
| 5,579,487 | 11/1996 | Meyerson et al. ................ 395/280 |
| 5,579,491 | 11/1996 | Jeffries et al. . |
| 5,579,528 | 11/1996 | Register . |
| 5,581,712 | 12/1996 | Herrman . |
| 5,581,714 | 12/1996 | Amini et al. . |
| 5,584,030 | 12/1996 | Husak et al. ................ 395/750 |
| 5,586,250 | 12/1996 | Carbonneau et al. . |
| 5,588,121 | 12/1996 | Reddin et al. . |
| 5,588,144 | 12/1996 | Inoue et al. . |
| 5,592,611 | 1/1997 | Midgely et al. . |
| 5,596,711 | 1/1997 | Burckhartt et al. ................ 395/182.21 |
| 5,598,407 | 1/1997 | Bud et al. ................ 370/330 |
| 5,602,758 | 2/1997 | Lincoln et al. ................ 364/505 |
| 5,606,672 | 2/1997 | Wade . |
| 5,608,865 | 3/1997 | Midgely et al. . |
| 5,608,876 | 3/1997 | Cohen et al. . |
| 5,615,207 | 3/1997 | Gephardt et al. . |
| 5,621,159 | 4/1997 | Brown et al. ................ 73/9 |
| 5,622,221 | 4/1997 | Genga, Jr. et al. ................ 165/208 |
| 5,625,238 | 4/1997 | Ady et al. ................ 307/147 |
| 5,627,962 | 5/1997 | Goodrum et al. ................ 395/182.11 |
| 5,628,028 | 5/1997 | Michelson . |
| 5,630,076 | 5/1997 | Saulpaugh et al. ................ 395/284 |
| 5,631,847 | 5/1997 | Kikinis ................ 364/514 R |
| 5,632,021 | 5/1997 | Jennings et al. . |
| 5,636,341 | 6/1997 | Matsushita et al. . |
| 5,638,289 | 6/1997 | Yamada et al. . |
| 5,644,470 | 7/1997 | Benedict et al. . |
| 5,644,731 | 7/1997 | Liencres et al. . |
| 5,651,006 | 7/1997 | Fujino et al. . |
| 5,652,832 | 7/1997 | Kane et al. . |
| 5,652,833 | 7/1997 | Takizawa et al. . |
| 5,652,839 | 7/1997 | Giorgio et al. ................ 395/200.11 |
| 5,652,892 | 7/1997 | Ugajin ................ 395/750 |
| 5,652,908 | 7/1997 | Douglas et al. ................ 395/800 |
| 5,655,081 | 8/1997 | Bonnell et al. . |
| 5,655,083 | 8/1997 | Bagley ................ 395/182.31 |
| 5,655,148 | 8/1997 | Richman et al. . |
| 5,659,682 | 8/1997 | Devarakonda et al. . |
| 5,664,118 | 9/1997 | Nishigaki et al. ................ 395/283 |
| 5,664,119 | 9/1997 | Jeffries et al. . |
| 5,666,538 | 9/1997 | DeNicola . |
| 5,668,943 | 9/1997 | Attanasio et al. . |
| 5,668,992 | 9/1997 | Hammer et al. ................ 395/651 |
| 5,669,009 | 9/1997 | Buktenica et al. ................ 395/800.35 |
| 5,671,371 | 9/1997 | Kondo et al. ................ 395/306 |
| 5,675,723 | 10/1997 | Ekrot et al. . |
| 5,680,288 | 10/1997 | Carey et al. . |
| 5,682,328 | 10/1997 | Roeber et al. . |
| 5,684,671 | 11/1997 | Hobbs et al. . |
| 5,689,637 | 11/1997 | Johnson et al. . |
| 5,696,895 | 12/1997 | Hemphill et al. . |
| 5,696,899 | 12/1997 | Kalwitz . |
| 5,696,949 | 12/1997 | Young . |
| 5,696,970 | 12/1997 | Sandage et al. . |
| 5,701,417 | 12/1997 | Lewis et al. . |
| 5,704,031 | 12/1997 | Mikami et al. . |
| 5,708,775 | 1/1998 | Nakamura . |
| 5,708,776 | 1/1998 | Kikinis . |
| 5,712,754 | 1/1998 | Sides et al. ................ 361/58 |
| 5,715,456 | 2/1998 | Bennett et al. ................ 395/652 |
| 5,717,570 | 2/1998 | Kikinis ................ 361/685 |
| 5,721,935 | 2/1998 | DeSchepper et al. . |
| 5,724,529 | 3/1998 | Smith et al. . |
| 5,726,506 | 3/1998 | Wood . |

| | | | |
|---|---|---|---|
| 5,727,207 | 3/1998 | Gates et al. ............................ | 395/651 |
| 5,732,266 | 3/1998 | Moore et al. ......................... | 395/651 |
| 5,737,708 | 4/1998 | Grob et al. ............................ | 455/557 |
| 5,737,747 | 4/1998 | Vishlitzky et al. .................. | 711/118 |
| 5,740,378 | 4/1998 | Rehl et al. . | |
| 5,742,514 | 4/1998 | Bonola ................................. | 364/492 |
| 5,742,833 | 4/1998 | Dea et al. ...................... | 395/750.05 |
| 5,747,889 | 5/1998 | Raynham et al. . | |
| 5,748,426 | 5/1998 | Bedingfield et al. . | |
| 5,752,164 | 5/1998 | Jones ................................... | 455/33.1 |
| 5,754,396 | 5/1998 | Felcman et al. ..................... | 361/683 |
| 5,754,449 | 5/1998 | Hoshal et al. ....................... | 364/550 |
| 5,754,797 | 5/1998 | Takahashi . | |
| 5,758,165 | 5/1998 | Shuff .................................... | 395/712 |
| 5,758,352 | 5/1998 | Reynolds et al. .................... | 707/200 |
| 5,761,033 | 6/1998 | Wilhelm . | |
| 5,761,045 | 6/1998 | Olson et al. . | |
| 5,761,085 | 6/1998 | Giorgio ................................ | 364/505 |
| 5,761,462 | 6/1998 | Neal et al. . | |
| 5,761,707 | 6/1998 | Aiken et al. ......................... | 711/118 |
| 5,764,924 | 6/1998 | Hong . | |
| 5,764,968 | 6/1998 | Ninomiya . | |
| 5,765,008 | 6/1998 | Desai et al. . | |
| 5,765,198 | 6/1998 | McCrocklin et al. . | |
| 5,767,844 | 6/1998 | Stoye ................................... | 345/212 |
| 5,768,541 | 6/1998 | Pan-Ratzlaff . | |
| 5,768,542 | 6/1998 | Enstrom et al. . | |
| 5,771,343 | 6/1998 | Hafner et al. . | |
| 5,774,640 | 6/1998 | Kurio . | |
| 5,774,645 | 6/1998 | Beaujard et al. . | |
| 5,774,741 | 6/1998 | Choi . | |
| 5,777,897 | 7/1998 | Giorgio ................................ | 364/557 |
| 5,778,197 | 7/1998 | Dunham ............................... | 395/284 |
| 5,781,703 | 7/1998 | Desai et al. . | |
| 5,781,716 | 7/1998 | Hemphill et al. . | |
| 5,781,744 | 7/1998 | Johnson et al. ...................... | 395/283 |
| 5,781,767 | 7/1998 | Inoue et al. . | |
| 5,781,798 | 7/1998 | Beatty et al. . | |
| 5,784,555 | 7/1998 | Stone .................................. | 395/200.5 |
| 5,784,576 | 7/1998 | Guthrie et al. . | |
| 5,787,019 | 7/1998 | Knight et al. ........................ | 364/550 |
| 5,787,459 | 7/1998 | Stallmo et al. ...................... | 711/112 |
| 5,787,491 | 7/1998 | Merkin et al. ....................... | 711/173 |
| 5,790,775 | 8/1998 | Marks et al. ..................... | 395/182.07 |
| 5,790,831 | 8/1998 | Lin et al. . | |
| 5,793,948 | 8/1998 | Asahi et al. . | |
| 5,793,987 | 8/1998 | Quackenbush et al. . | |
| 5,794,035 | 8/1998 | Golub et al. . | |
| 5,796,185 | 8/1998 | Takata et al. . | |
| 5,796,580 | 8/1998 | Komatsu et al. .................... | 361/687 |
| 5,796,934 | 8/1998 | Bhanot et al. . | |
| 5,796,981 | 8/1998 | Abudayyeh et al. . | |
| 5,797,023 | 8/1998 | Berman et al. ................. | 395/750.06 |
| 5,798,828 | 8/1998 | Thomas et al. . | |
| 5,799,036 | 8/1998 | Staples . | |
| 5,799,196 | 8/1998 | Flannery . | |
| 5,801,921 | 9/1998 | Miller . | |
| 5,802,269 | 9/1998 | Poisner et al. . | |
| 5,802,298 | 9/1998 | Imai et al. ...................... | 395/200.47 |
| 5,802,305 | 9/1998 | McKaughan et al. ........... | 395/200.57 |
| 5,802,324 | 9/1998 | Wunderlich et al. ................ | 395/281 |
| 5,802,393 | 9/1998 | Begun et al. . | |
| 5,802,552 | 9/1998 | Fandrich et al. . | |
| 5,802,592 | 9/1998 | Chess et al. ......................... | 711/164 |
| 5,803,357 | 9/1998 | Lakin ................................. | 236/78 B |
| 5,805,804 | 9/1998 | Laursen et al. . | |
| 5,805,834 | 9/1998 | McKinley et al. . | |
| 5,809,224 | 9/1998 | Schultz et al. . | |
| 5,809,256 | 9/1998 | Najemy . | |
| 5,809,287 | 9/1998 | Stupek, Jr. et al. ................. | 395/500 |
| 5,809,311 | 9/1998 | Jones ............................... | 395/750.01 |
| 5,809,555 | 9/1998 | Hobson ................................ | 711/172 |
| 5,812,748 | 9/1998 | Ohran et al. .................... | 395/182.02 |
| 5,812,750 | 9/1998 | Dev et al. . | |
| 5,812,757 | 9/1998 | Okamoto et al. . | |
| 5,812,858 | 9/1998 | Nookala et al. . | |
| 5,815,117 | 9/1998 | Kolanek . | |
| 5,815,647 | 9/1998 | Buckland et al. .............. | 395/182.01 |
| 5,815,651 | 9/1998 | Litt . | |
| 5,815,652 | 9/1998 | Ote et al. . | |
| 5,821,596 | 10/1998 | Miu et al. ............................ | 257/419 |
| 5,822,547 | 10/1998 | Boesch et al. . | |
| 5,826,043 | 10/1998 | Smith et al. . | |
| 5,829,046 | 10/1998 | Tzelnic et al. ........................ | 711/162 |
| 5,835,719 | 11/1998 | Gibson et al. .................. | 395/200.51 |
| 5,835,738 | 11/1998 | Blackledge, Jr. et al. . | |
| 5,838,932 | 11/1998 | Alzien ................................. | 395/308 |
| 5,841,964 | 11/1998 | Yamaguchi . | |
| 5,841,991 | 11/1998 | Russell . | |
| 5,845,061 | 12/1998 | Miyamoto et al. . | |
| 5,845,095 | 12/1998 | Reed et al. . | |
| 5,850,546 | 12/1998 | Kim . | |
| 5,852,720 | 12/1998 | Gready et al. . | |
| 5,852,724 | 12/1998 | Glenn, II et al. . | |
| 5,857,074 | 1/1999 | Johnson . | |
| 5,857,102 | 1/1999 | McChesney et al. ................ | 395/653 |
| 5,864,653 | 1/1999 | Tavallaei et al. ..................... | 315/181 |
| 5,864,654 | 1/1999 | Marchant . | |
| 5,864,713 | 1/1999 | Terry . | |
| 5,867,730 | 2/1999 | Leyda . | |
| 5,875,307 | 2/1999 | Ma et al. ............................. | 395/281 |
| 5,875,308 | 2/1999 | Egan et al. . | |
| 5,875,310 | 2/1999 | Buckland et al. .................... | 395/306 |
| 5,878,237 | 3/1999 | Olarig . | |
| 5,878,238 | 3/1999 | Gan et al. ............................ | 395/308 |
| 5,881,311 | 3/1999 | Woods ................................. | 395/824 |
| 5,884,027 | 3/1999 | Garbus et al. .................... | 395/200.8 |
| 5,884,049 | 3/1999 | Atkinson . | |
| 5,886,424 | 3/1999 | Kim ...................................... | 307/64 |
| 5,889,965 | 3/1999 | Wallach et al. ...................... | 395/283 |
| 5,892,898 | 4/1999 | Fujii et al. . | |
| 5,892,915 | 4/1999 | Duso et al. . | |
| 5,892,928 | 4/1999 | Wallach et al. ...................... | 395/283 |
| 5,893,140 | 4/1999 | Vahalia et al. ....................... | 711/118 |
| 5,898,846 | 4/1999 | Kelly . | |
| 5,898,888 | 4/1999 | Guthrie et al. ....................... | 395/308 |
| 5,905,867 | 5/1999 | Giorgio .......................... | 395/200.54 |
| 5,907,672 | 5/1999 | Matze et al. . | |
| 5,909,568 | 6/1999 | Nason . | |
| 5,911,779 | 6/1999 | Stallmo et al. ......................... | 714/6 |
| 5,913,034 | 6/1999 | Malcolm . | |
| 5,922,060 | 7/1999 | Goodrum ............................. | 710/103 |
| 5,930,358 | 7/1999 | Rao ......................................... | 380/4 |
| 5,935,262 | 8/1999 | Barrett et al. ......................... | 714/46 |
| 5,936,960 | 8/1999 | Stewart ................................ | 370/438 |
| 5,938,751 | 8/1999 | Tavallaei et al. ..................... | 710/103 |
| 5,941,996 | 8/1999 | Smith et al. .......................... | 714/47 |
| 5,964,855 | 10/1999 | Bass et al. ............................ | 710/103 |
| 5,983,349 | 11/1999 | Kodama et al. ..................... | 713/200 |
| 5,987,554 | 11/1999 | Liu et al. .............................. | 710/129 |
| 5,987,621 | 11/1999 | Duso et al. .............................. | 714/4 |
| 5,987,627 | 11/1999 | Rawlings, III ........................ | 714/48 |
| 6,012,130 | 1/2000 | Beyda et al. ......................... | 711/173 |
| 6,038,624 | 3/2000 | Chan et al. ........................... | 710/103 |

OTHER PUBLICATIONS

SES SCSI Enclosure Services, X3T10/Project 1212–D/Rev 8a, Jan. 1997.*

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

Davis, T, Usenet post to alt.msdos.programmer, Apr. 1997, "Re: How do I create an FDISK batch file?".

Davis, T., Usenet post to alt.msdos.batch, Apr. 1997, "Re: Need help with automating FDISK and FORMAT . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novell® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFRAME."

Rigney, PC Magazine, 14(17): 375–379, Oct. 10, 1995, "The One for the Road (Mobile–aware capabilities in Windows 95)."

Shanley, and Anderson, PCI System Architecture, Third Edition, p. 382, Copyright 1995.

ftp.cdrom.com/pub/os2/diskutil/, PHDX software, phdx.zip download, Mar. 1995, "Parallel Hard Disk Xfer."

Cmasters, Usenet post to microsoft.public.windowsnt.setup, Aug. 1997, "Re: FDISK switches."

Hildebrand, N., Usenet post to comp.msdos.programmer, May 1995, "Re: Structure of disk partition into."

Lewis, L., Usenet post to alt.msdos.batch, Apr. 1997, "Re: Need help with automating FDISK and FORMAT."

Netframe, http://www.netframe–support.com/technology/datasheets/data.htm, before Mar. 1997, "Netframe Cluster-System 9008 Data Sheet."

Simos, M., Usenet post to comp.os.msdos.misc, Apr. 1997, "Re: Auto FDISK and FORMAT."

Wood, M. H., Usenet post to comp.os.netware.misc, Aug. 1996, "Re: Workstation duplication method for WIN95."

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulletin, 92A+62947, pp. 391–394, Oct. 1992, Method for Card Hot Plug Detection and Control.

Haban, D. & D. Wybranietz, *IEEE Transaction on Software Engineering,* 16(2):197–211, Feb. 1990, "A Hybrid Monitor for Behavior and Performance Analysis of Distributed Systems."

* cited by examiner

METHOD FOR DETERMINING AND DISPLAYING THE PHYSICAL SLOT NUMBER OF AN EXPANSION BUS DEVICE

PRIORITY

The benefit under 35 U.S.C. § 119(e) of the following U.S. provisional applications is hereby claimed:

| Title | Application No. | Filing Date |
|---|---|---|
| "Hot Plug Software Architecture for Off the Shelf Operating Systems" | 60/046,311 | May 13, 1997 |
| "Means for Allowing Two or More Network Interface Controller Cards to Appear as One Card to an Operating System" | 60/046,491 | May 13, 1997 |

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to systems and methods of determining the physical location of devices in a computer system. Specifically, this invention relates to systems and methods for determining and displaying the physical location and unique identification numbers of PCI devices in a computer system.

2. Description of the Related Art

Personal computers communicate internally and externally through devices connected to their expansion slots. Various bus standards have been developed to standardize communications between the computer system and devices linked through the computer system's expansion slots. Examples of these bus standards are the Industry Standard Architecture (ISA), the Extended Industry Standard Architecture (EISA) and the Peripheral Component Interconnect (PCI) architecture.

In order for computer programs to communicate with devices attached to a PCI bus, every computer program must have a way to uniquely access its corresponding PCI device. For this reason, unique identification numbers are calculated for each function residing on a PCI bus card. This unique number is normally a compilation of the bus number, device number and function number of the particular function within the PCI bus card. However, in a hybrid bus environment, such as a computer with both PCI and ISA buses, this unique identification number may not be truly unique. If two devices within the computer system are inadvertently given the same "unique" identification number, conflicts will arise as the devices are accessed by software programs. For this reason, some operating systems generate a identification number that utilizes more information than simply the bus number, device number and function number to access bus devices.

For example, Novell Netware assigns a unique number known as a hardware instance number ON) to each device located within the computer system. The HIN is normally a number that uniquely identifies a device location in the computer, even within a hybrid bus environment.

Unfortunately, operating systems such as Novell Netware display and monitor the functionality of each device in the system by the device number. A failing device within a computer system will be identified by its unique identification number or HIN. However, there is no way for a technician to easily correlate the physical location of a device in the computer system based on the device's unique identifier or HIN. Thus a need exists for a system that allows a technician to rapidly determine the physical location of a failing device within a computer system.

In addition, features of some operating systems, such as Novell Netware, assign tasks based on the HIN of a particular device. For example, a computer system may have two identical network interface cards (NICs). A technician may want to load a particular piece of software to run on one of the NICs, but not the other. In order to load the software, Netware requires that the technician specify the correct NIC by its hardware instance number. However, because there is no correlation between the HIN and the physical location of a device in the system, the technician must use trial and error to attach the software to the appropriate NIC. Unfortunately, there is no easy mechanism for determining the physical location of a device in the computer system based on a HIN. Therefore, a need exists for a method to identify and correlate HINs with the physical location of devices in a computer system.

SUMMARY OF THE INVENTION

One embodiment of the present invention is a method of displaying the physical location of a device in a computer system. In this embodiment, the method includes the steps of a) determining the slot number of a device attached to the bus of a computer, b) determining a unique identifier for said device and c) associating the slot number and unique identifier of said device.

Another embodiment of the invention is a method for displaying the Hardware Instance Number and expansion slot number of a device in a computer. This embodiment includes the process of a) determining the bus number, slot number, device number and function number of a device in communication with an expansion bus of the computer, b) calculating a unique number identifying the device, c) passing the unique number to a Bus Interface (BI) Function, wherein the BI function returns a Hardware Interface Number (HIN), and d) displaying the HIN, bus number, slot number, device number and the slot number on a computer display.

Yet another embodiment of the invention is a programmed storage device. The programmed storage device stores instructions that when executed perform the method of displaying the physical location of a device in a computer system. The method performed by the instructions in the programmed storage device includes the steps of a) determining the slot number of a device attached to the bus of a computer, b) determining a unique identifier for said device and c) associating the slot number and unique identifier of said device.

Still another embodiment of the invention is another programmed storage device. The programmed storage device stores instructions that when executed perform the method of displaying the Hardware Instance Number and expansion slot number of a device in a computer. The instructions in the programmed storage device perform the process of a) determining the bus number, slot number, device number and function number of a device in communication with an expansion bus of the computer, b) calculating a unique number identifying the device, c) passing the unique number to a Bus Interface (BI) Function, wherein the BI function returns a Hardware Interface Number (HIN), and d) associating the HIN, bus number, slot number, device number and the slot number.

DETAILED DESCRIPTION OF THE INVENTION

This invention relates to a system and method for determining the physical location of devices located within a computer system. In one embodiment, the physical location is correlated with the unique identification number generated for the device so that both are displayed to the user. In this embodiment, the unique identification number is a hardware instance number (HIN) within a computer system running Novell Netware. Embodiments of the invention include a software program that scans every slot attached to every PCI bus of a computer system to determine whether any PCI devices are present. If such a device is present, the software displays the bus number, logical slot number, device number, function number and HIN of the device.

Software embodiments can be written in any well known language such as C, C++, Fortran, Basic, Cobol or any other conventional computer programming language. In addition, the disclosed methods are portable to any computer system that supports expansion devices. In addition, the software can be stored onto any well-known programmed storage device such as hard disks, floppy disks, Random Access Memory, Read-Only Memory, or other like device.

Figure 1:
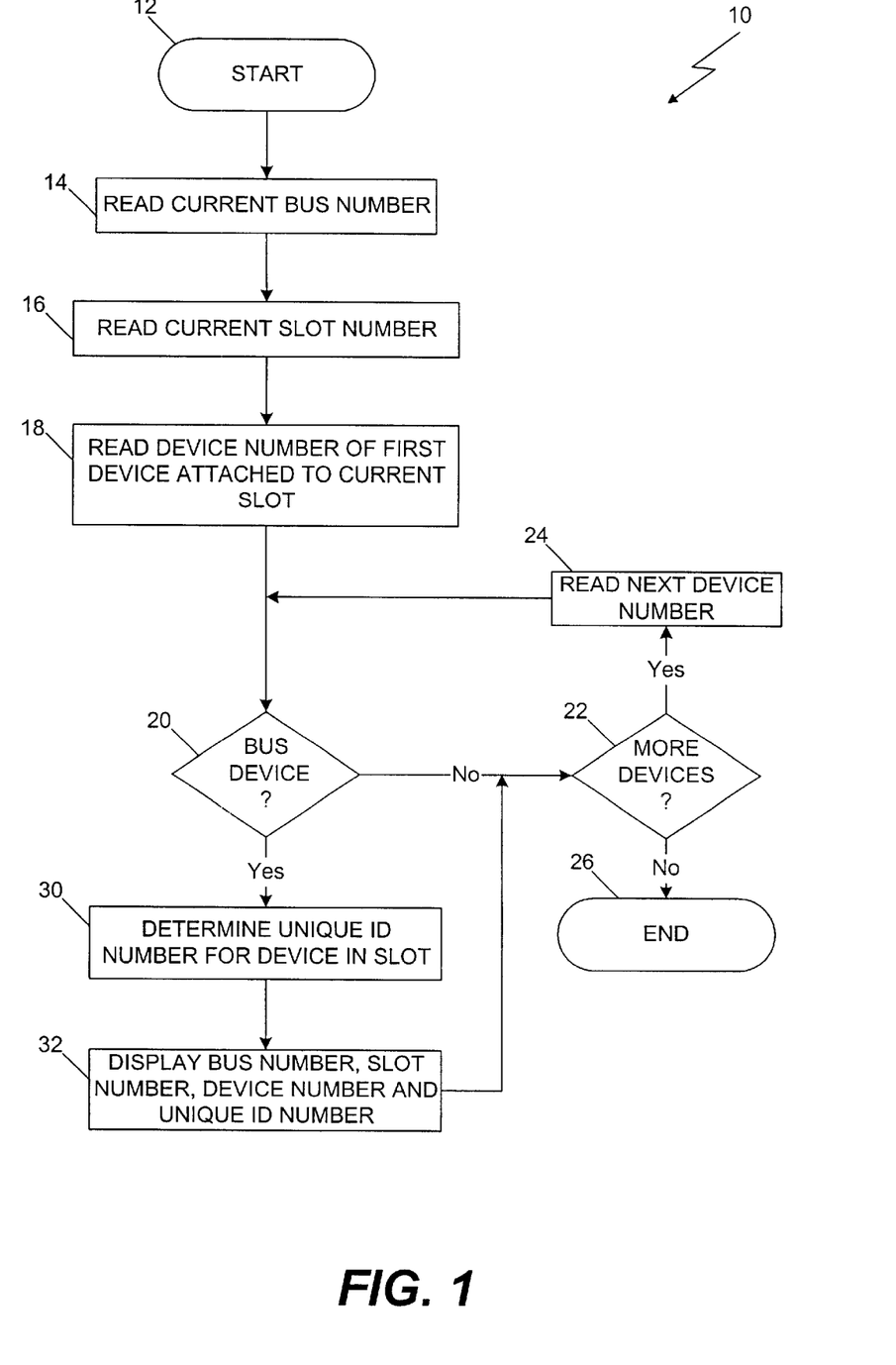
FIG. 1 is a flow diagram illustrating one embodiment of a method of determining the HIN for each device in an expansion slot in a computer system.

FIG. 1 illustrates an overall process 10 of displaying the physical location and unique identification information for a device within a computer system The process 10 begins at a start state 12 and moves to a state 14 wherein the bus number of the first bus in the computer system is read. As is known, some computer systems have multiple buses, each of which may contain several expansion slots and devices. For example, the expansion bus might be a PCI, ISA or EISA-based bus within a personal computer. The process 10 then moves to state 16 and reads the current slot number for the first expansion slot in the current bus. As discussed above, the expansion slot number normally corresponds to a particular position along the expansion bus of a personal computer.

Once the slot number has been read at state 16, the process 10 moves to state 18 wherein the device number of the first device attached to the current expansion slot is read. The process 10 then moves to a decision state 20 to determine if there is a bus device attached at the current expansion slot Bus devices are devices such as Network Interface Cards, Communications Adapters and other devices attached to an expansion bus.

If a decision is made at the decision state 20 that the device is not a bus device, the process 10 moves to a decision state 22 to determine whether any additional devices exist for the current bus number and slot number. If more devices exist, the process 10 typically moves to a state 24 and reads the next device number. The process 10 then returns to state 20 to determine whether the new device is a bus device. If a decision was made at the decision state 22 that no more devices were found in communication with the current expansion slot, the process 10 completes at an end state 26.

If a determination was made at the decision state 20 that the current device was a bus device, the process 10 moves to a state 30 to determine a unique ID number for the bus device. As discussed above, one type of unique ID number is Hardware Instance Number.

Once a unique ID number for a device has been determined at state 30, the process 10 moves to state 32 to display the current bus number, slot number, device number and unique ID number. Thus, the physical location of every bus device, along with its unique ID number, may be displayed on the screen. The process 10 then returns to state 22 to determine whether any other devices exist in the computer system. A technician could thereby use the system outlined in FIG. 1 to determine the physical location of devices, such as network interface cards within the computer system.

Figure 2:
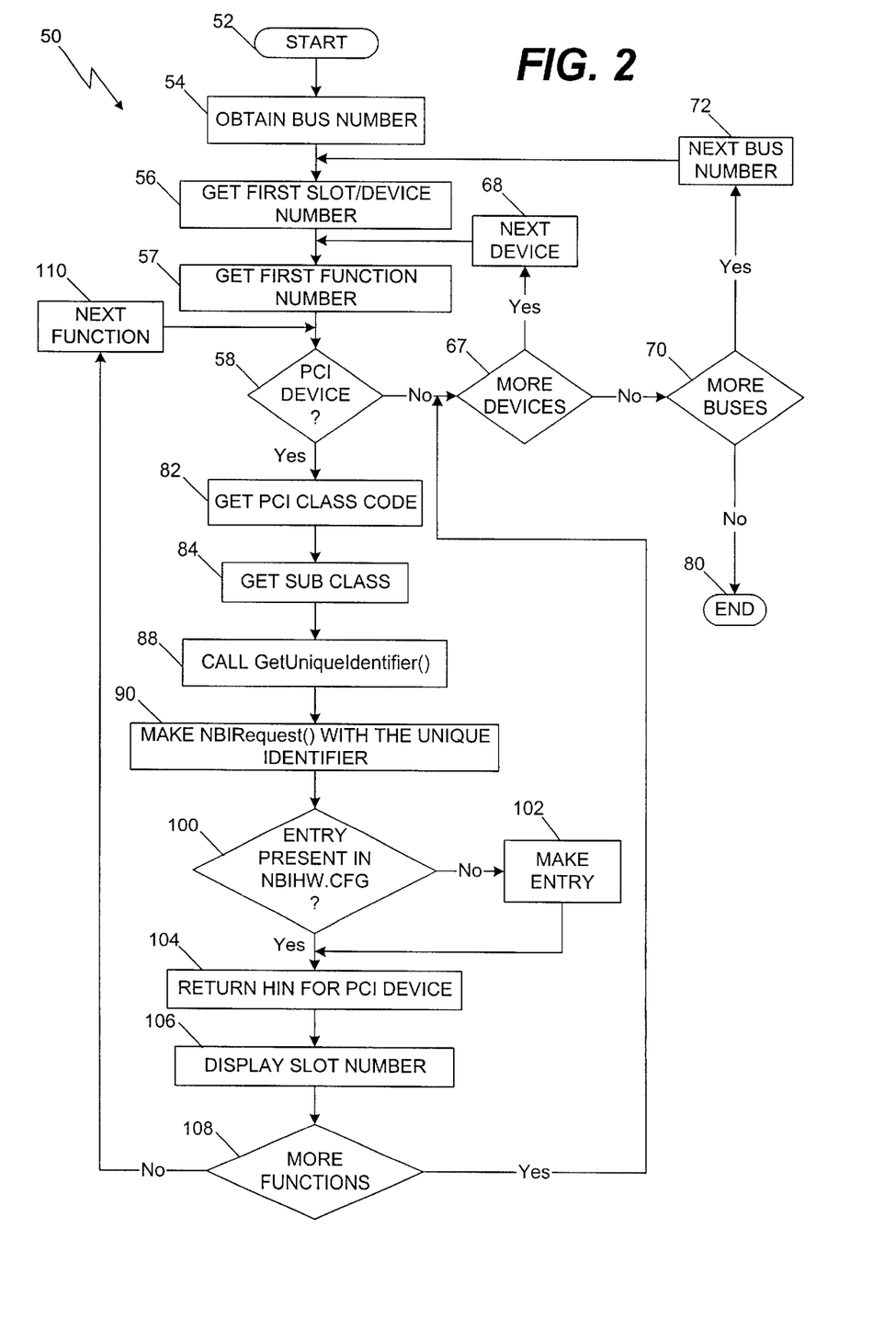
FIG. 2 is a flow diagram illustrating a second embodiment of determining and displaying the HIN and slot number for each device in a computer system.

Embodiments of the system described herein allow the user to look at the computer display and determine that a device having unique ID number 10030 corresponds to, for example, a Network Interface Card located in bus #1, slot #2 of the computer system. If the user has been notified by an error detection system that a network interface card with unique ID number 10030 is failing, the user knows that the NIC in slot #2 needs to be replaced. FIG. 2 provides details of one embodiment of a system for displaying the unique ID number of PCI devices within a computer system. It should be noted that the implementation listed below for a PCI bus is only one embodiment of the invention. Other embodiments that include alternative bus protocols such as ISA and EISA are also contemplated.

FIG. 2 illustrates a process 50 for displaying the logical slot number and HIN for every PCI device in a computer system. The process 50 begins at a start state 52 and then moves to state 54 wherein the number of the first bus is obtained. As is known, some computer systems use a multi-bus approach such that more than one expansion bus may exist within a single computer system. For example, some computer systems may have a PCI bus and a ISA bus in order to be compatible with current and past bus architectures.

Once the bus number for the first bus has been obtained at state 54, the process 50 moves to state 56 wherein the slot number of the firs device to be analyzed is retrieved. The process 50 then moves to state 57 and retrieves the function number of the first function of the device. As is known, the variable returned by PCI function number 0 normally indicates whether the current device is a standard PCI adapter or a multifunction PCI adapter. The process 50 then moves to a decision state 58 wherein a determination is made, based on the code returned by PCI function number 0, whether the device is a PCI type device. If a determination is made that the device is not a PCI device, the process 50 moves to a decision state 67 wherein a determination is made whether more devices are available for analysis in the current bus. If more devices are available in the in the current bus, the process 50 typically moves to state 68 to identify the next device. The process 50 then typically loops to state 57 to get the first function number of the device.

If a determination is made at the decision state 67 that no more devices are available for analysis in the cent bus, the process 50 moves to a decision state 70 to determine whether more buses are available within the current computer system. If a determination is made at the decision state 70 that more buses do exist, the process 50 moves to state 72 to determine the next bus number, and then returns to state 56 to obtain the slot number of the device. If no more buses exist at the decision state 70, the process 50 ends at an end state 80.

If a determination is made at the decision state 58 that a PCI device is located in the current slot under evaluation, the process 50 moves to state 82 wherein the PCI ClassCode is returned from the PCI device. The process 50 then moves to state 84 wherein the PCI SubClass code is determined. The process 50 then moves to state 88 wherein the Netware GetUniqueIdentifier( ) function is called and passed the parameters of the current bus number, function number and device number. The GetUniqueIdentifier( ) function is a Novell Netware implementation of a method for determining a unique identifier for a device located on a particular bus. The unique identifier, in this case, includes the bus number, device number and function number.

Once the unique identifier has been returned by the GetUniqueIdentfier( ) function, the process moves to state 90 wherein a Netware NBIRequest( ) function is made with an operation code of "NBI_REGISTER_INSTANCE", the PCI ClassCode and the unique identifier. The Netware NBIRequest( ) function calculates a MN for this particular device and function. The process 50 then moves to a decision state 100 to determine whether the calculated HIN is present in the NBIHW.CFG configuration file. If the HIN is not present within the NBIHW.CFG configuration file, the process 50 moves to state 102 and makes an entry into the file. A file entry would be missing in a case, for example, when a new network interface card was hot-swapped into the computer system.

However, if an entry for the HIN was present in the NBIHW.CFG configuration file at the decision state 100, the process 50 moves to state 104 and returns the HIN for the PCI device. The process 50 then moves to state 106 wherein the previously determined slot number, bus number, device number and HIN are displayed to the user's computer display. Table 1 illustrates an example of a type of table that might be displayed. The process 50 then moves to a decision state 108 to determine whether any additional functions exist for the current PCI device. If no more functions exist, the process 50 returns to the decision state 67 to determine whether any additional devices are present in the current bus. However, if more additional functions do exist at the decision state 108, the process 50 moves to state 110 to determine the next function in the PCI device. The process then returns to decision state 58 to determine if the new function corresponds to a PCI device.

TABLE 1

Example of Display Showing HINs and Slot Numbers

| BUS NUMBER | DEVICE NUMBER | FUNCTION NUMBER | SLOT NUMBER | HIN |
|---|---|---|---|---|
| 2 | 4 | 0 | 1 | 10010 |
| 2 | 5 | 0 | 2 | 10028 |
| 2 | 6 | 0 | 3 | 10030 |
| 2 | 7 | 0 | 4 | 10032 |
| 2 | 8 | 0 | 5 | 10040 |

Although specific embodiments of the invention have been described herein, the invention is not limited to only these embodiments. Other embodiments of the invention, including alternative computer systems, operating systems and software languages are contemplated. The present invention should not be construed to be limited to only those embodiments discussed above, but should only be limited by the scope of the appended claims.

INCORPORATION BY REFERENCE OF COMMONLY OWNED APPLICATIONS

The following patent applications, commonly owned and filed on the same day as the present application are hereby incorporated herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |

-continued

| Title | Application No. | Attorney Docket No. |
|---|---|---|
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |

-continued

| Title | Application No. | Attorney Docket No. |
|---|---|---|
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 09/941,955 | MNFRAME.055A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method of displaying the physical location of a failing function running on a device in a computer system, comprising:
   a) determining slot numbers of devices attached to a bus of said computer;
   b) determining unique identifiers for each function running on said devices;
   c) associating said slot numbers and said unique identifiers to determine a slot number for each of said functions;
   d) calculating a first identifier corresponding to said failing function; and
   e) displaying the slot number of said failing function by matching said first identifier with said unique identifiers.

2. The method of claim 1, wherein said associating includes the method of associating said unique identifier and said slot number on a computer display.

3. The method of claim 1, wherein said device is a PCI device and said bus is a PCI bus.

4. The method of claim 1, wherein computer is based on an Intel Pentium, Pentium Pro or Pentium II microprocessor.

5. A programmed storage device, storing instructions that when executed perform the method of:
   a) determining slot numbers of devices attached to a bus of a computer;
   b) determining unique identifiers for each function running on said devices;
   c) associating said slot number and said unique identifiers to determine a slot number for each of said functions;
   d) calculating a first identifier corresponding to a failing function; and
   e) displaying the slot number of said failing function by matching said first identifier with said unique identifiers.

6. The programmed storage device of claim 5, wherein said associating includes the process of associating said slot number and said unique identifier on a display.

7. The method of claim 5, wherein at least one of said devices is a PCI device and said bus is a PCI bus.

8. The method of claim 5, wherein computer is based on an Intel Pentium, Pentium Pro or Pentium II microprocessor.

9. The method of claim 5, wherein said computer is operating under a Novell Netware operating system.

* * * * *